May 1, 1962  C. J. GEURTS  3,032,122
SPRING TRIP RELEASE
Filed Sept. 21, 1960  4 Sheets-Sheet 2

INVENTOR.
CLETUS J. GEURTS
BY
Braddock and Braddock
ATTORNEYS

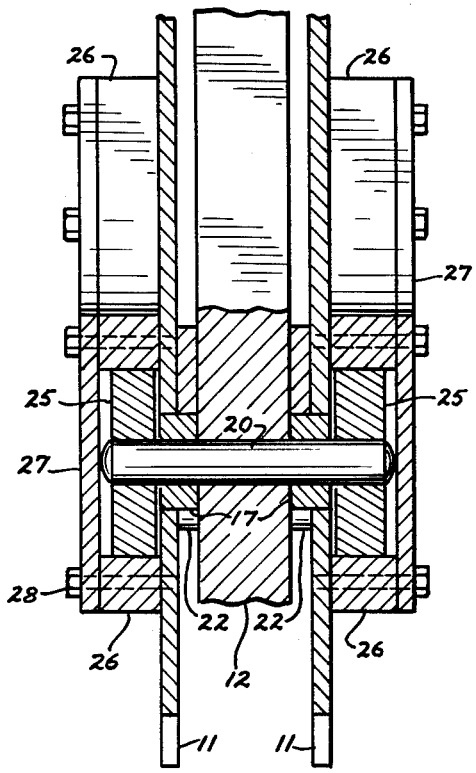
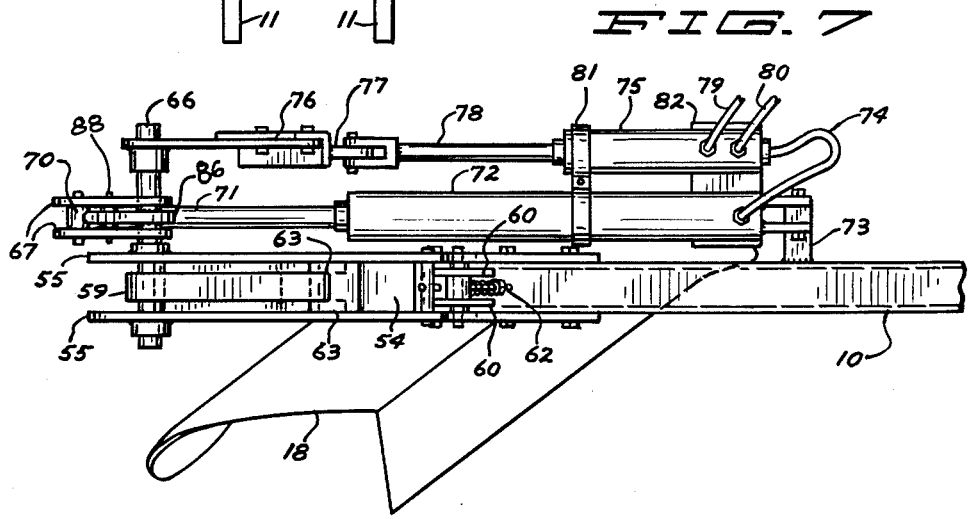

May 1, 1962
C. J. GEURTS
3,032,122
SPRING TRIP RELEASE
Filed Sept. 21, 1960
4 Sheets-Sheet 4
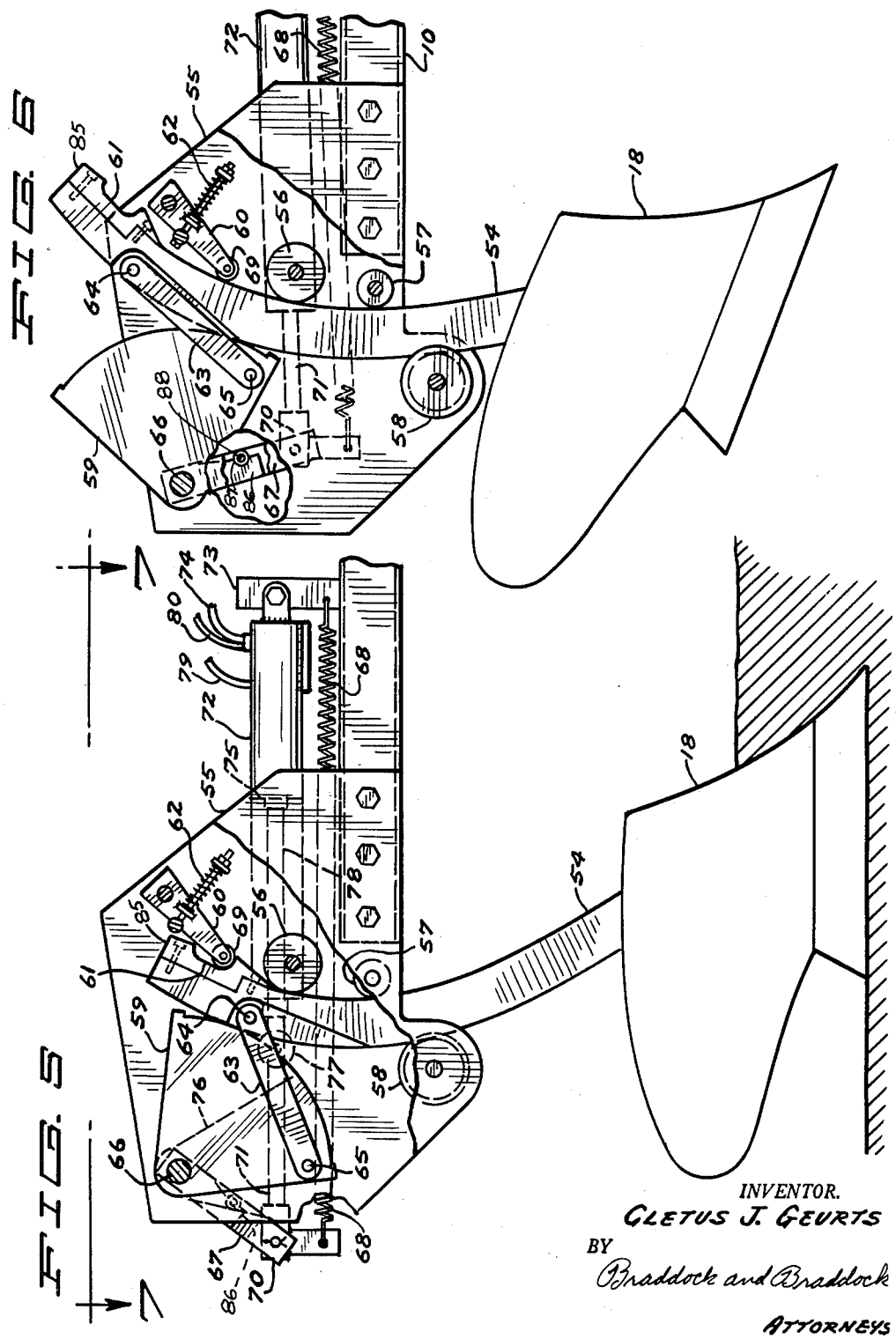
INVENTOR.
*Cletus J. Geurts*
BY
*Braddock and Braddock*
ATTORNEYS

United States Patent Office 3,032,122
Patented May 1, 1962

3,032,122
SPRING TRIP RELEASE
Cletus J. Geurts, Box 415, Graceville, Minn.
Filed Sept. 21, 1960, Ser. No. 57,582
12 Claims. (Cl. 172—264)

The present invention has relation to trip releases and more particularly to a spring trip plow share release that will allow a plow share to come out of the ground when it strikes a rock or solid object and prevent structural damage.

A plow share standard that is equipped with a spring trip device is usually pivoted in a manner so that when the trip releases the plow share will pivot downwardly and rearwardly. The point of the plow share digs into the ground as the bottom moves rearwardly and thereby supports a substantial portion of the weight of the plow. The untripped shares also will be lifted out of the ground. This introduces unnecessary loads on the plow share and standard and makes design and operation more difficult and expensive.

A spring trip made according to the present invention allows the plow share to move upwardly and rearwardly when it trips and thereby eliminates the "digging in" of the plow share point. In the present invention the plow share point never goes below plowing depth.

Present spring trip devices do not have any automatic method of returning the plow share to its down and locked position in the ground. The operator must back the plow up to reset the spring trip. The present invention incorporates a device which, as shown, uses hydraulic pressure from a system on a tractor pulling the plow to automatically return the plow share to the normal plowing position and reset the spring trip without stopping the tractor or backing it up.

It is an object of the present invention to present a spring trip for a plow that eliminates the downward movement of the tripped share and automatically returns the share to its normal plowing position.

In the drawings:

FIG. 4 is a sectional view taken as on line 4—4 in FIG. 3;

FIG. 5 is a side elevational view of a plow share with a spring trip release made according to a second form of the present invention installed thereon with parts in section and parts broken away;

FIG. 6 is a side elevational view of the device of FIG. 5 with parts in section and parts broken away to show a plow share in the tripped position; and FIG. 7 is a top plan view of the device of FIG. 5.

Figure 1:
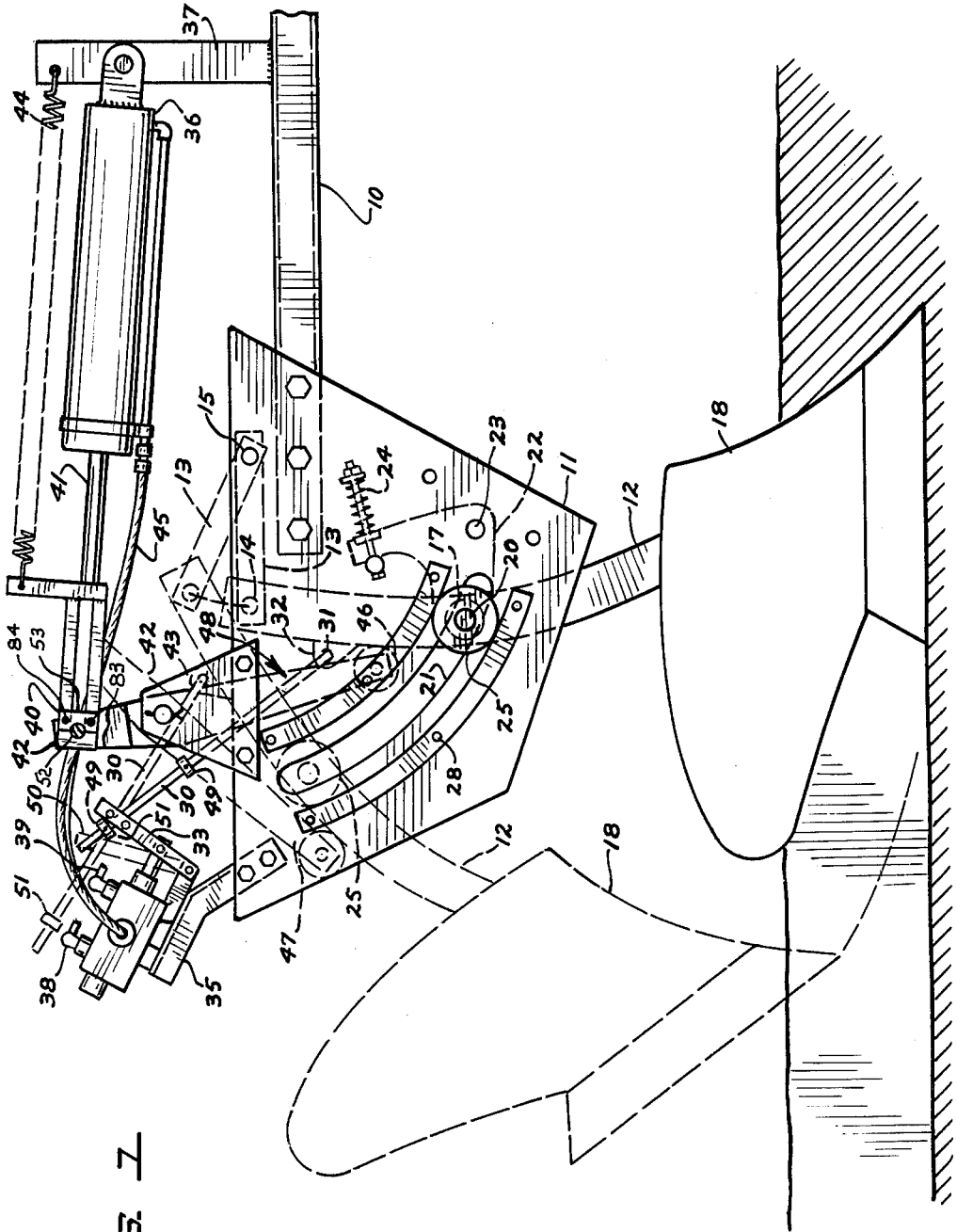
FIG. 1 is a side elevational view of a plow with a spring trip release made according to a first form of the present invention installed on said plow.
Figure 2:
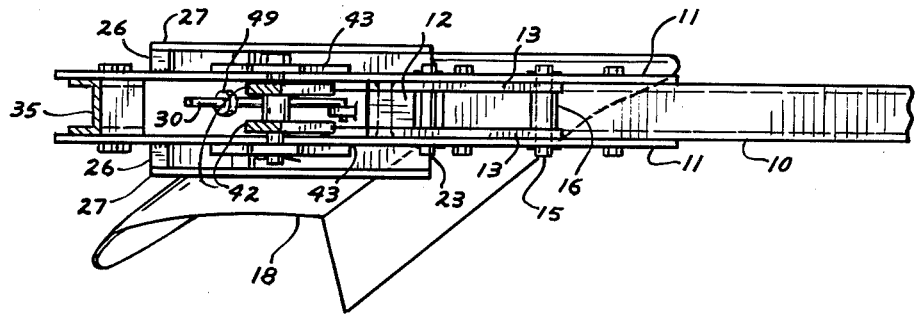
FIG. 2 is a sectional view taken as on line 2—2 in FIG. 3.
Figure 3:
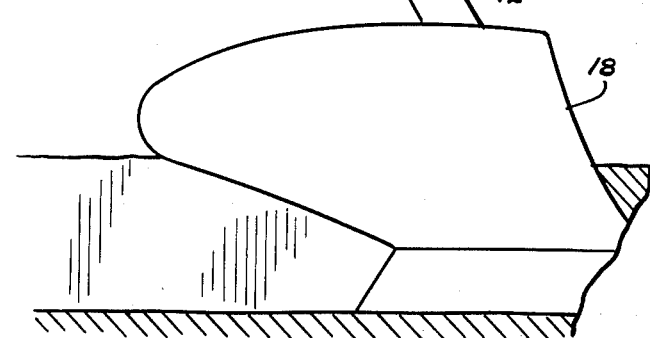
FIG. 3 is a side elevational view of the device of FIG. 1 with parts in section and parts broken away.

Referring to a first form of the present invention shown in FIGS. 1 through 4 and the numerals of reference thereon, a plow beam 10 of a conventional mold board type plow has two downwardly extending latch frame plates 11, 11 fixedly attached to it. A plow standard 12 is slidably fitted between the frame plates and supported by a pair of guidestraps 13, 13 that are pivotally attached at a first end thereof to standard 12, as at 14, and are pivotally mounted at a second end thereof on a bolt 15 extending between the frame plates 11. A spacer 16 is mounted over bolt 15 and between guides 13, 13 to keep the guides properly positioned. A plow share 18 is attached to the lower end of standard 12 and engages the ground in normal plowing position.

A pair of rollers 17, 17 are rotatably mounted on a pin 20 that is fixedly positioned through standard 12. One of the rollers 17 is positioned to ride in a slot 21 in each of plates 11. A pair of latch hooks 22, 22 are pivoted, as at 23, to the frame plates 11 and engage the rollers 17, 17 to hold the standard and plow share in normal plowing position. An adjustable spring assembly 24 urges the latch hooks into engagement with the rollers. A thrust washer 25 is fixedly attached to each end of pin 20 and serves to position and guide standard 12. Bar spacers 26 are fixedly attached to frame plates 11 and serve to guide the thrust washers 25. A cover plate 27 is mounted, as at 28, onto the spacers on each of frame plates 11 and serves to keep dust and dirt out of the latch mechanism.

An actuator rod 30 is pivotally mounted, as at 31, to an ear 32 on standard 12 and extends upwardly to slidably engage a control handle 33 of a hydraulic valve 34. Hydraulic valve 34 is mounted on a bracket 35 that is fixedly attached to frame plates 11. A pressure line 38 supplies oil from a hydraulic pump (not shown), such as one mounted on a tractor pulling the plow, and a return line 39 provides passage back to reservoir when the valve is in a neutral position.

A hydraulic cylinder 36 is pivotally mounted to an upright arm 37 that is fixedly attached to beam 10. A slotted bracket 40 is attached to a piston rod 41. A pin 52 is slidably fitted in the slot of the bracket and engages a pair of lever arms 42, 42 that are pivotally mounted between two extension plates 43, 43 that in turn are mounted on frame plates 11. A piston (not shown) is slidably mounted within cylinder 36 and is attached to piston rod 41. A tension coil spring 44 is mounted between bracket 40 and arm 37 and urges the bracket and piston rod toward the cylinder. A hose 45 provides a passageway for oil between the cylinder and hydraulic valve. A retainer clip 53 is fastened to bracket 40 with a pivot bolt 83 and a shear bolt 84 and keeps the pin 52 adjacent an outer end of the slot in bracket 40. Shear bolt 84 is of smaller diameter than pivot bolt 83 and is of dimension sufficient to carry normal loads.

Lever arms 42 extend downwardly and have a roller 46 rotatably mounted between them. The lever arms may move between a first normal position 47 as shown by dotted lines in FIG. 1, when the piston rod is moved inwardly toward the cylinder under the action of spring 44 and a second position 48 where roller 46 engages plow standard 12 in plowing position.

*Operation of First Form of Invention*

When the plow share 18 strikes a rock or other object with sufficient force the latch hooks 22, 22 will release rollers 17, 17 and the standard 12 and the share 18 will rotate upwardly and rearwardly guided by rollers 17 in slots 21. The double pivot (numerals 14 and 15) of guide straps 13 allows the plow share to move rearwardly without digging further into the ground. When the standard 12 moves sufficiently rearward, a stop collar 49 on actuator rod 30 engages control handle 33 and moves it to an open position as seen in dotted lines at 50. Fluid under pressure from the pump is then diverted by the valve from hose 38 through hose 45 and into cylinder 36. The resulting pressure in cylinder 36 from the hydraulic pump forces the internal piston and rod and the bracket 40 outwardly. The force from the piston, acting through the clip 53 and pin 52 causes lever arms 42, 42 to move so roller 46 contacts standard 12 and forces the standard and attached plow share back downwardly to plowing position. The latch hooks 22 move to engage rollers 17 and hold the standard in plowing position. In this position a second stop collar 51 on actuator rod 30 engages the control handle 33 and returns it to the normal neutral position of the valve. Oil from the hydraulic pump will then be permitted by the valve to flow back through the return line to the reservoir. Spring 44 returns the piston rod and lever arms to position 47. The oil in the cylinder is forced through hose 45 and ports in valve 34 to return line 39 and then to the reservoir. The latch is thereby automatically reset without stopping the tractor, backing up or other maneuvering.

If the plow share strikes a rock or other solid object when the levers 42, 42 are moving the standard toward plowing position, shear bolt 84 may shear and retainer clip 53 will pivot about pivot bolt 83 to allow the pin 52 to slide in the slot in bracket 40 as the piston rod moves outwardly and thereby prevent any damage to the plow share or the return mechanism. When the plow has cleared the object the pin 52 may be repositioned adjacent the outer end of the slot and the shear bolt 84 replaced.

Referring now to FIGS. 5 through 7, a second form of the present invention is shown and parts identical with parts in the first form will be identically numbered. A plow share 18 is attached to a standard 54 that is slidably positioned between a pair of latch frame plates 55, 55 that in turn are bolted to a plow beam 10. Standard 54 is positioned by an upper roller 56, a center roller 57 and a lower roller 58, all rotatably mounted between latch plates 55, 55.

A cam plate 59 serves as a guide on the rear of standard 54. A pair of connecting links 63, 63 pivotally engage standard 54, as at 64, and are pivotally connected to cam plate 59, as at 65. A latch dog 60 has a rotatably mounted roller 69 that engages a notch 61 in a replaceable wear plate 85 that is fixedly attached to the forward edge of standard 54. Said latch dog holds the standard in plowing position under normal loads. A spring 62 engages dog 60 and resiliently urges the roller 69 into engagement with notch 61.

Cam plate 59 is fixedly mounted on a shaft 66 that is rotatably mounted on latch frame plates 55, 55 and extends laterally outward therefrom. An arm 86 is fixedly attached to the outwardly extending portion of shaft 66 and has a notch defined in a forward edge thereof. A pair of levers 67, 67 are pivotally mounted on shaft 66, one on each side of arm 86. A bushing 87 is positioned between the levers with a shear bolt 88. A rod end 70 is pivotally fastened between the arms 67, 67 and is an integral outward extension of a piston rod 71. The piston rod 71 and an attached internal piston (not shown) are slidably fitted in a cylinder 72 that is pivotally attached to a bracket 73 extending from beam 10. A hose 74 is connected to the internal chamber of cylinder 72 and is also connected to a hydraulic valve 75 and provides passageway for hydraulic fluid from the control valve to the cylinder.

A valve actuator cam 76 is fixedly attached to shaft 66 adjacent its outer end portion and is of configuration to engage a roller 77 on the end of a spring loaded control valve rod 78 and hold said rod with the valve in a position to divert flow of hydraulic fluid from a source of fluid under pressure (not shown), such as a standard hydraulic system on a tractor pulling the plow, to the cylinder when the standard 54 is in a tripped position as shown in FIG. 6. A pressure line 79 and a return line 80 provide passageway for hydraulic fluid from the pressure source through the valve and back to a reservoir (not shown) when the valve is in a neutral position. Valve 75 is supported on cylinder 72 with a clamp 81 and a bracket 82.

Bushing 87 is positioned to engage the notch on arm 86 when the piston rod is extended. A spring 68 is positioned to resiliently urge the piston rod inwardly and thereby rotate levers 67, 67 away from the arm 86 when the plow share is in plowing position and the valve is in neutral position.

*Operation of Second Form of Invention*

When the plow share strikes a rock or other object while plowing, the roller 69 is forced out of notch 61 and the standard 54 will move upwardly, guided by the rollers 56, 57 and 58 and cam plate 59. The connecting links 63, 63 will rotate cam plate 59 and the attached shaft 66 as the standard moves upwardly. Cam plate 59 is of configuration to constantly engage standard 54 as it rotates. The arm 86 and valve cam 76 will rotate toward cylinder 72. When the standard has moved to a position as shown in FIG. 6 the valve cam 76 engages roller 77 on rod 78 and the valve will be moved to position so the fluid from the pressure source will be diverted to cylinder 72. The internal piston and rod of the cylinder will be forced outwardly by pressure and the standard will be returned to plowing position by force of the cylinder acting through the bushing 87 bearing on arm 86 and thereby rotating shaft 66 and attached linkage to its original position. The roller 69 will again engage notch 61 and hold the standard in position for plowing. The valve cam 76 will move to a clearing relationship with roller 77 and the spring-loaded valve will return to its neutral position. The spring trip latch is thereby automatically operative without stopping the tractor, backing up or other maneuvering on the part of the operator.

If the plow share strikes a rock or other object when the force from the cylinder is moving the standard from its stripped position to plowing position, shear bolt 88 may shear and the levers 67 will move past arm 86 without exerting further force on the attached linkage. When the plow has cleared the object the cylinder may be moved to position to allow the shear bolt 88 and bushing 87 to be replaced and the unit will function as before.

Both forms of the invention disclose a latch that permits a tripped standard to move upwardly as it moves rearwardly to clear the object that caused the tripping action and thereby prevent the point of the plow share from digging into the ground and supporting substantially the entire weight of the plow. This also enables a farmer to have a smoother surface on the plowed field as the rest of the shares of the plow remain in engagement with the ground when the one share is tripped. The automatic return of the standard to plowing position through provided linkage greatly decreases time loss when the plow trips.

What is claimed is:

1. The combination with a plow having a beam, a standard and a plow share attached to said standard, of: a frame attached to said beam; said standard being positioned with respect to said frame and movable between a first plowing and a second tripped position; a latch member pivotally mounted with respect to said frame; resilient means for normally urging said latch member into retaining relationship with respect to said standard in said plowing position, said latch member being movable to releasing relationship with respect to said standard against the action of said resilient means when said plow share strikes an obstruction; and means for moving said standard from said tripped to said plowing position including a hydraulic cylinder mounted with respect to said plow beam and having a piston with rod slidably mounted therein and movable between a first and a second position, linkage connected to said rod and operably contacting said standard to move said standard from said tripped position to said plowing position responsive to the movement of said piston with rod to said first position, controllable means mounted with respect to said beam to divert flow from a source of fluid under pressure to said cylinder and thereby move said piston with rod to said first position, and linkage operatively connected between said standard and said controllable means for moving said controllable means to position to divert said flow to said cylinder responsive to the movement of said standard to said tripped position.

2. The combination as specified in claim 1 wherein said linkage connected to said rod and operably contacting said standard includes a frangible member.

3. A release mechanism for a plow share including a main mounting member, a link pivotally mounted to said member, a plow share standard integral with said plow share and pivotally mounted to said link, a roller mounted on said standard, a hook pivotally mounted with respect to said mounting member, resilient means normally urging said hook into engaging and retaining relationship with respect to said roller, said hook being movable to clearing relationship with respect to said roller against the action of said resilient means when said plow share strikes an unyielding object.

4. A release mechanism for a plow having a beam and a standard with attached plow share, said mechanism including frame plates mounted on said beam, one of said plates having a roller guide, said standard being positioned between said frame, plates and movable between a first plowing and a second tripped position, a link pivotally attached a forward end thereof with respect to said frame plates and pivotally attached adjacent a rearward end thereof to an upper portion of said standard, a roller mounted on said standard to be slidable upwardly and rearwardly within said roller guide when said standard moves from said plowing to said tripped position, a latch hook pivotally mounted with respect to said frame plates and being of configuration to engage a portion of said roller with said standard in said plowing position, and resilient means normally urging said latch hook into engaging and retaining realtionship with respect to said roller, said hook being of configuration to move to clearing relationship with respect to said roller against the action of said resilient means from the resulting force on said standard when said plow share strikes an unyielding object.

5. The combination as specified in claim 4, means for moving said standard from said tripped position to said plowing position including a cylinder and piston with rod slidably mounted therein positioned with respect to said beam, said piston with rod being movable between a first position and a second position, controllable means mounted with respect to said beam to divert flow from a source of fluid under pressure to said cylinder and thereby force said piston with rod to said first position, linkage connected to said piston with rod and positioned to operably contact said standard when said piston with rod moves to said first position and thereby move said standard from said tripped position to said plowing position, and means operatively connected between said standard and said controllable means responsive to the movement of said standard for actuating said controllable means to divert flow to said cylinder.

6. The combination as specified in claim 5 wherein said linkage connected to said piston with rod and contacting said standard includes a frangible member.

7. The combination with a plow having a beam and a standard with attached plow share, of: frame plates mounted to said beam and each having a guide slot defined therein, said standard being slidably positioned between said plates and movable rearwardly and upwardly from a first plowing position to a second tripped position, a roller mounted on each side of said standard on an axis fixed with respect to said standard, said rollers being movable upwardly and rearwardly guided by said slots as said standard moves from said plowing to said tripped position, a link pivotally attached adjacent a forward end thereof to said frame plates and pivotally attached adjacent a rearward end thereof to an upper portion of said standard, a latch hook pivotally mounted on said frame plates and positioned to engage one of said rollers with said standard in said plowing position, a spring positioned to normally urge said latch hook into engaging and retaining relationship with respect to said rollers, said hooks being of configuration to move to clearing relationship with respect to said rollers against the action of said spring under a force on said standard resulting when said plow share strikes an obstruction while plowing and being of configuration to yieldably move to re-engage said roller when said standard moves from said tripped to said plowing position, a lever pivotally mounted with respect to said frame plates, said lever being movable from a first to a second position and being of configuration to operably engage said standard to force said standard to said plowing position as said lever moves to said second position, and means operably connected to said lever for forcibly actuating said lever to said second position, said means being operable responsive to the movement of said standard to said tripped position.

8. The combination as specified in claim 7 wherein said means for moving said lever to said second position includes a hydraulic cylinder mounted on said plow beam, a piston with rod slidably mounted within said cylinder with said rod pivotally attached to said lever and movable to a first position with said lever in its second position, controllable means to divert flow from a source of fluid under pressure to said cylinder and thereby move said piston with rod to said first position, and an actuator rod attached to said standard and operably engaging said controllable means to cause said controllable means to divert said flow to said cylinder when said standard moves to said tripped position.

9. The combination as specified in claim 8 wherein said actuator rod engages said controllable means and moves said controllable means to position to allow flow from said cylinder when said standard moves to said plowing position.

10. The combination as specified in claim 9 wherein the pivotal connection between said piston with rod and said lever includes a frangible member.

11. The combination with a plow having a beam and a standard with attached plow share, of: transversely spaced frame plates mounted to said beam, said standard being slidably positioned between said frame plates and movable between a first plowing and a second tripped position, a plurality of rollers rotatably mounted between said plates and positioned to guide said standard, a notch defined in said standard, a dog engaging said notch with said standard in said plowing position, resilient means normally urging said dog into engaging and retaining relationship with respect to said notch when said standard is in said plowing position, said dog being of configuration to move to a clearing relationship with respect to said notch against the action of said resilient means from the force transmitted to said dog by said standard when said plow share strikes an obstruction, an outwardly extending shaft rotatably mounted on said frame plates and positioned rearwardly from said standard, a cam fixedly attached to said shaft and being of configuration to bear on a rearward surface of said standard as said standard moves from said plowing to said tripped position, a link pivotally connecting said cam and said standard, an arm fixedly attached to an outer portion of said shaft, a lever pivotally mounted on said shaft, a frangible member attached to said lever, a piston with rod pivotally mounted with respect to said lever, a cylinder slidably mounted over said piston, said piston with rod being movable to a first position wherein said frangible member contacts said arm to actuate said linkage to move said standard from said tripped position to said plowing position, controllable means for diverting flow from a source of fluid under pressure to said cylinder and thereby forcing said piston with rod to said first position, and a cam fixedly attached to said shaft and being of configuration to operably engage said controllable means and to move said controllable means to position to divert said flow to said cylinder when said standard moves to said tripped position.

12. The combination as specified in claim 11 wherein said cam moves to allow said controllable means to move to permit flow from said cylinder when said standard moves to said plowing position.

(References on following page)

References Cited in the file of this patent

UNITED STATES PATENTS

| | | |
|---|---|---|
| 444,986 | Bloominger | Jan. 20, 1891 |
| 843,993 | Breen | Feb. 12, 1907 |
| 843,994 | Breen | Feb. 12, 1907 |
| 1,285,900 | Bartholomew | Nov. 26, 1918 |
| 1,892,978 | Burch | Jan. 3, 1933 |
| 2,707,425 | Charley | May 3, 1955 |
| 2,969,119 | Barry | Jan. 24, 1961 |

FOREIGN PATENTS

| | | |
|---|---|---|
| 106,467 | Australia | Feb. 2, 1939 |